(12) United States Patent
Desbois et al.

(10) Patent No.: US 8,759,476 B2
(45) Date of Patent: Jun. 24, 2014

(54) METHOD FOR PRODUCING POLYAMIDES

(75) Inventors: Philippe Desbois, Edingen-Neckarhausen (DE); Hagen Stawitzki, Karlsruhe (DE); Ralf Neuhaus, Heidelberg (DE); Hans-Joachim Weis, Speyer (DE); Jurgen Weichmann, Bad Durkheim (DE); Racquel Fernandez Rodiles, Mannheim (DE); Gunter Vogel, Speyer (DE)

(73) Assignee: BASF SE, Ludwigshafen (DE)

( * ) Notice: Subject to any disclaimer, the term of this patent is extended or adjusted under 35 U.S.C. 154(b) by 329 days.

(21) Appl. No.: 12/665,564

(22) PCT Filed: Jun. 12, 2008

(86) PCT No.: PCT/EP2008/057360
§ 371 (c)(1),
(2), (4) Date: Dec. 18, 2009

(87) PCT Pub. No.: WO2008/155281
PCT Pub. Date: Dec. 24, 2008

(65) Prior Publication Data
US 2010/0190934 A1 Jul. 29, 2010

(30) Foreign Application Priority Data
Jun. 20, 2007 (EP) .................................. 07110656

(51) Int. Cl.
*C08G 69/26* (2006.01)
(52) U.S. Cl.
USPC ........... 528/310; 528/322; 528/323; 528/325; 528/338; 528/345
(58) Field of Classification Search
USPC .................. 528/310, 322, 323, 325, 338, 345
See application file for complete search history.

(56) References Cited

U.S. PATENT DOCUMENTS

| | | | |
|---|---|---|---|
| 4,617,342 A * | 10/1986 | Poppe et al. | 524/606 |
| 4,963,646 A | 10/1990 | Galland et al. | |
| 5,079,307 A | 1/1992 | Taylor et al. | |
| 5,298,595 A * | 3/1994 | Reimann et al. | 528/324 |
| 5,708,125 A * | 1/1998 | Liedloff et al. | 528/310 |
| 5,728,800 A | 3/1998 | Gottschalk et al. | |
| 2010/0190952 A1 | 7/2010 | Desbois et al. | |
| 2011/0092645 A1 | 4/2011 | Loth et al. | |
| 2011/0144300 A1 | 6/2011 | Desbois et al. | |

FOREIGN PATENT DOCUMENTS

| | | |
|---|---|---|
| DE | 1720349 A1 | 6/1971 |
| DE | 19514145 A1 | 10/1996 |
| EP | 0 129 105 A1 | 12/1984 |
| EP | 0129195 A2 | 12/1984 |
| EP | 0667367 A2 | 8/1995 |

OTHER PUBLICATIONS

Rogers et al. "Synthetic Methods in Step-Growth Polymers—3. Polyamides" (Jul. 29, 2003), John Wiley & Sons, XP002487964 pp. 135-195.
U.S. Appl. No. 13/378,980, filed Mar. 1, 2012, Schmidt et al.

* cited by examiner

*Primary Examiner* — Gregory Listvoyb
(74) *Attorney, Agent, or Firm* — Drinker Biddle & Reath LLP

(57) ABSTRACT

The process for preparing a polyamide based on dicarboxylic acids and diamines has the following stages:
1) providing an aqueous monomer mixture of dicarboxylic acids and diamines, the molar ratio of dicarboxylic acids to diamines being adjusted such that a molar deficiency of dicarboxylic acids or diamines of from 1 to 10 mol % is present at the outlet of stage 3), based on the other component in each case,
2) transferring the aqueous mixture from stage 1) to a continuous evaporator reactor in which diamines and dicarboxylic acids are reacted at a temperature in the range from 100 to 370° C. and a pressure in the range from 1 to 50 bar,
3) transferring the mixture from stage 2) to a separator which is operated at a temperature in the range from 100 to 370° C. with removal of gaseous components,
4) transferring the mixture from stage 3) together with diamine or dicarboxylic acid in an amount suitable to balance out the molar deficiency into an extruder which is operated at a temperature in the range from 150 to 400° C. for a residence time in the range from 10 seconds to 30 minutes to remove gaseous components through devolatilizing orifices.

5 Claims, No Drawings

METHOD FOR PRODUCING POLYAMIDES

CROSS REFERENCE TO RELATED APPLICATIONS

This application is a national phase of PCT/EP 2008/057360, filed on Jun. 12, 2008which claims priority to EP 07110656.1 filed Jun. 20, 2007, the entire contents of all are hereby incorporated by reference.

The invention relates to a process for preparing a polyamide based on dicarboxylic acids and diamines. More particularly, the invention relates to such a process for preparing partly aromatic partly crystalline polyamides.

The preparation of polyamides, especially polyamides with a high viscosity number, typically entails the use of high reaction temperatures. This in turn leads to the increased occurrence of side reactions. The high viscosity additionally leads to enhanced deposit formation in the reactor and, in the worst case, to blockage of the reactor. Shutdown times and complicated reactor cleaning are the consequences.

EP-A-0 129 105 relates to a process for continuously preparing polyamides, in which an aqueous solution of salts of dicarboxylic acids and diamines is heated in an evaporator zone under elevated pressure with simultaneous evaporation of water and formation of a prepolymer. Prepolymers and vapor are separated continuously, the vapors being rectified and entrained diamines being returned. The prepolymer is passed into a polycondensation zone.

To increase the molecular weight, according to DE-A-1 720 349, nylon-6,6 can be condensed further in a self-cleaning, high-intermeshing, screw reactor with devolatilizing orifices.

According to DE-A-195 14 145, the preparation of a polymer based on a dicarboxylic acid and a diamine is additionally possible by polycondensation in a reactor. In this preparation, a solid mixture of the monomers is first converted in a contrarotatory twin-screw extruder and then in a corotatory twin-screw extruder.

Partly aromatic, partly crystalline thermoplastic polyamides are typically prepared in a batch process. Such a process is described, for example, in EP-A-0 667 367.

Some of the above processes are very complicated, for example in the case of use of two extruders, or, in the case of preparation of partly aromatic, partly crystalline polyamides, do not suitably allow control over the viscosity number such that a temperature increase and side reactions, and also deposit formations, would be preventable.

Typically, a pressure increase in the polycondensation leads to a lowering of the viscosity number. For high-viscosity polyamides, however, the pressure frequently cannot be increased to such a high degree that the viscosity number of the polyamide can be reduced as desired.

It is therefore an object of the present invention to provide a process for preparing polyamides based on dicarboxylic acids and diamines, which avoids the disadvantages of the known processes and, more particularly, enables the preparation of partly aromatic, partly crystalline polyamides with a high viscosity number without their being significant formations of deposits in the reactor or side reactions.

The object is achieved in accordance with the invention by a process for preparing a polyamide based on dicarboxylic acids and diamines, comprising the following stages:

1) providing an aqueous monomer mixture of dicarboxylic acids and diamines, the molar ratio of dicarboxylic acids to diamines being adjusted such that a molar deficiency of dicarboxylic acids or diamines of from 1 to 10 mol % is present at the outlet of stage 3), based on the other component in each case,
2) transferring the aqueous mixture from stage 1) to a continuous evaporator reactor in which diamines and dicarboxylic acids are reacted at a temperature in the range from 100 to 370° C. and a pressure in the range from 1 to 50 bar,
3) transferring the mixture from stage 2) to a separator which is operated at a temperature in the range from 100 to 370° C. with removal of gaseous components,
4) transferring the mixture from stage 3) together with diamine or dicarboxylic acid in an amount suitable to balance out the molar deficiency into an extruder which is operated at a temperature in the range from 150 to 400° C. for a residence time in the range from 10 seconds to 30 minutes to remove gaseous components through devolatilizing orifices.

The process according to the invention allows the reduction of the viscosity of the polyamide before the solid-phase polycondensation and allows a reduction in the residence time at high temperature, as a result of which fewer side reactions, such as triamine formation, occur and hence the quality of the product is improved. It has been found in accordance with the invention that a procedure in which dicarboxylic acid or diamine is initially present in deficiency and this deficiency is not balanced out until introduction into an extruder for post-condensation allows the preparation of polyamides, especially partly aromatic, partly crystalline polyamides with a high viscosity number. The process is advantageous for the preparation of all high molecular weight polyamides, but has advantages especially where the monomer mixture in stage 1) consists of a dicarboxylic acid mixture of from 60 to 88% by weight of terephthalic acid and from 12 to 40% by weight of isophthalic acid, in which up to 20% by weight of the dicarboxylic acid mixture may be replaced by other dicarboxylic acids, and hexamethylenediamine which may be up to 20% by weight replaced by other $C_{2-30}$-diamines.

The process according to the invention has the sequence of evaporator reactor-separator-extruder, an aqueous monomer mixture of dicarboxylic acids and diamines being conducted into the evaporator reactor. The molar ratio of dicarboxylic acids to diamines is adjusted such that, at the outlet of the downstream separator stage, a molar deficiency of dicarboxylic acids or diamines of from 1 to 10 mol %, based on the other component in each case, is present. This can be achieved, for example, by providing a molar deficiency of dicarboxylic acid or diamine actually on provision of the aqueous monomer mixture. When, however, a portion of the dicarboxylic acids or diamines is removed by evaporation from the reaction mixture downstream of the evaporator reactor, it is also possible to start with equimolar amounts of dicarboxylic acids and diamines in the evaporator reactor, since a deficiency of dicarboxylic acids or diamines is present downstream of this separator. The monomer ratio in stage 1) is selected such that, at the outlet of stage 3, a molar deficiency of dicarboxylic acids or diamines of from 1 to 10 mol %, based on the other component in each case, is present. For example, in the case of 100 mol % of dicarboxylic acids, from 90 to 99 mol % of diamines may correspondingly be present at the end of stage 3. The exact stoichiometry to be established in the aqueous monomer mixture depends on the type of the monomers and can be determined by simple analysis of the mixture obtained from the separator in stage 3). To this end, for example, the polyamide or polyamide oligomers obtained at the end of stage 3) can be analyzed with regard to the carboxyl end groups and amino end groups.

When the aforementioned preferred monomer mixture is used, typically hexamethylenediamine is discharged partly in gaseous form downstream of the evaporator reactor. It is then possible to start, for example, with equimolar amounts of hexamethylenediamine and dicarboxylic acids, as a result of which a deficiency of hexamethylenediamine is present in the (pre)polymer at the end of the separator. However, it is also possible to start with a molar excess of hexamethylenediamine compared to terephthalic acid and isophthalic acid in stage 1), such that a deficiency of terephthalic acid/isophthalic acid is present at the end of stage 3). In this case, terephthalic acid/isophthalic acid is then metered in the extruder in stage 4).

Typically, in stage 1), an aqueous salt solution of the starting monomers is used, since diamines and dicarboxylic acids form salts.

The monomer mixture consists preferably of 50 mol % of dicarboxylic acid mixture and 50 mol % of diamine or diamine mixture. The dicarboxylic acid mixture consists of from 60 to 88% by weight of terephthalic acid and from 12 to 40% by weight of isophthalic acid. Preferably from 64 to 80% by weight, especially from 64 to 76% by weight, of terephthalic acid is present, which corresponds to preferably from 20 to 36% by weight and especially from 24 to 36% by weight of isophthalic acid. In addition, up to 20% by weight of the dicarboxylic acid mixture may also be replaced by other dicarboxylic acids. This is preferably from 0 to 10% by weight, especially from 0 to 5% by weight. When some of the dicarboxylic acid mixture is replaced by other dicarboxylic acids, the lower limit of the other component is preferably at 0.5% by weight, especially at 1% by weight. Other suitable dicarboxylic acids are adipic acid, pimelic acid, suberic acid, azelaic acid and sebacic acid, and also 7-sulfoisophthalic acid.

The diamine component used is hexamethylenediamine which may be up to 20% by weight replaced by other $C_{2-30}$-diamines. Preferably from 0 to 10% by weight, especially from 0 to 5% by weight, of the hexamethylenediamine is replaced by other $C_{2-30}$-diamine. When other $C_{2-30}$-diamines are present, their minimum amount is preferably 0.5% by weight, especially at least 1% by weight. Suitable further diamines are, for example, tetramethylenediamine, octamethylenediamine, decamethylenediamine and dodecamethylenediamine, and also m-xylylenediamine, bis(4-aminophenyl)methane, bis(4-aminophenyl)-2,2-propane and bis(4-aminocyclohexyl)methane, or mixtures thereof.

As an additional diamine, preference is given to using bis(4-aminocyclohexyl)methane, which is obtainable under the name Dicycan from BASF AG.

Apart from terephthalic acid, isophthalic acid and hexamethylenediamine, preference is given to using no other dicarboxylic acids or diamines.

In stage 2), the aqueous mixture from stage 1) is transferred to a continuous evaporator reactor in which diamines and dicarboxylic acids are converted at a temperature in the range from 100 to 370'C, preferably from 200 to 340° C., and a pressure in the range from 1 to 50 bar, preferably from 5 to 30 bar. The evaporator reactor may be of any suitable design. It may, for example, be a tube bundle reactor as described in EP-A-0 129 195. It is preferably a vertical tubular reactor flowed through from the top downward.

The residence time in stage 2) is preferably from 0.2 to 10 minutes, more preferably from 1 to 5 minutes.

The evaporator reactor is followed downstream by a separator which is operated at a temperature of from 100 to 370° C., preferably from 200 to 340° C. The pressure in the separator is preferably from 1 to 50 bar, more preferably from 5 to 30 bar. The residence time in stage 3) is preferably from 1 to 45 minutes, more preferably from 2 to 15 minutes. In the separator, gaseous components, especially water and volatile monomers, are removed. For example, when the above-described preferred monomer mixture is used, from about 1 to 10% of the originally used diamine, hexamethylenediamine, is removed together with steam. This gaseous mixture can then be subjected to a distillation or rectification, in which case steam is removed via the top and a diamine/water mixture is obtained in the bottoms. This mixture can be recycled into stages 1) or 2) or into both stages. In general, in stage 3), steam and volatile dicarboxylic acids or diamines are removed, which are subsequently separated by distillation, and an aqueous condensate enriched in dicarboxylic acids or diamines is recycled into one or both of stages 1) and 2).

It is likewise possible to establish the excess of diamines through the proportion of the diamines discharged with the evaporation which are recycled into the process.

The separator of stage 3) is followed downstream by an extruder in stage 4), into which the mixture from stage 3) is conducted together with diamine or dicarboxylic acid in an amount suitable for balancing out the molar deficiency. The extruder is operated at a temperature in the range from 150 to 400° C., preferably from 200 to 370° C., and set to a residence time in the range from 10 seconds to 30 minutes, preferably from 2 seconds to 2 minutes. In the extruder, gaseous components are likewise removed through devolatilizing orifices.

Suitable extruders with devolatilizing stages are known to those skilled in the art. It is possible in accordance with the invention, with preference, to use twin-screw extruders, which may be corotatory or contrarotatory twin-screw extruders. For a description of the extruders, reference may be made to EP-A-0 129 195 and DE-A-195 14 145.

In stage 4, diamine or dicarboxylic acid is metered in, according to whether a deficiency of diamine or dicarboxylic acid is present after stage 3). The amount suitable for balancing out the molar deficiency can be determined by simple preliminary experiments, in which case the carboxyl end group content and amino end group content can be determined in the polyamide obtained downstream of the extruder. When a deficiency of diamines is initially employed, sufficient diamine is preferably metered in stage 4) that the amino end group content is increased by at least 20 mmol/kg. The amino end group content at the end of stage 4) is preferably from 30 to 250 mmol/kg, more preferably from 50 to 100 mmol/kg or from 70 to 220 mmol/kg. Addition to other stages of the process according to the invention is also possible.

The extrusion can additionally be followed by a solid-phase postcondensation and a granulation step.

The polyamides obtained after stage 4) preferably have a viscosity number in the range from 20 to 200, more preferably from 40 to 80, especially when the above-described preferred monomer mixture is used. When hexamethylenediamine is used, it is also possible to meter a different diamine in stage 4), for example Dicycan. In addition, it is possible in accordance with the invention to add further additives at different points in the process, such as oxazolines, hyperbranched polymers with amino or carboxyl groups and other additives. The additives may, for example, be fed in as a cold feed or hot feed in the separator upstream or downstream of a discharge pump after the evaporator reactor.

Preferred polyamides obtainable in accordance with the invention have a glass transition temperature in the range from 110 to 150° C. and a melting point in the range from 280 to 320° C. They preferably have a crystallinity of more than 20% and are therefore not transparent.

The invention is illustrated in detail by the examples which follow.

EXAMPLES

The system for continuous preparation and high-temperature-resistant polyamides from diamines (hexamethylenediamine, HMD) and dicarboxylic acids consists of the following function groups:

Mixture preparation
Metered addition and heating
Precondensation
Postcondensation
HMD rectification
Devolatilization and granulation Process Description:

The reaction solution is prepared in a stirred tank in the mixture preparation from the diamines, dicarboxylic acids, regulator and water, and transferred to the reservoir vessel. From the reservoir, by means of a feed pump, the reaction solution is metered into the top of the vertical evaporator reactor via the heater. In the oil-heated apparatus filled with random packings, the monomers react under pressure and temperature with elimination of water (polycondensation) to give the low molecular weight precursor. The effluent mixture of precursor, vaporous water of solution and of reaction, and some of the unconverted HMD are passed into the downstream separator. There, the polymer melt is separated from the vaporous fractions. The vapor streams removed are conducted to the rectification column and irrigated with cold water. As a result, the evaporated monomers and the entrained polymer particles are separated from the steam. The HMD, which is obtained in the bottom in the form of an aqueous solution, is pumped in circulation and, after removal of the now solidified polymer particles, pumped back through filters to the reaction solution upstream of the evaporator reactor. The polymer melt from the separator is enriched with amine upstream of the subsequent gear pump. The pump is used to meter the melt to the extruder, and the remaining water is outgassed. Polymer discharged in strands is cooled with water and granulated.

Mixture Preparation

All components of the mixture (approx. 360 kg) are dissolved at 95° C. in a stirred tank.

After a dissolution time of 60 min, a sample is taken to determine the pH. The pH is adjusted to a value of 6.95-7.05 by adding HMD or a terephthalic acid/isophthalic acid mixture, in order to establish the stoichiometry of the mixture. Subsequently, the amount of regulator required is added.

When the mixture is prepared as described, it can be transferred to the reservoir vessel via a vapor recovery line.

Metered addition and heating.
Precondensation

The mixture solution is pumped from the reservoir vessel by means of a feed pump, temperature-controlled at 95° C., to the evaporator reactor. At the same time, it is also charged by the recycle pump with oligomer-containing water.

In this oil-heated (Lauda thermostat W 3151) reactor, the monomers react with elimination of water to give low molecular weight, i.e. short-chain, polyamide. At the same time, virtually all of the water of solution and of reaction evaporates.

The evaporator reactor consists of 2 tubes with a diameter of 33.6 mm and length 1000 mm, and of 2 tubes with a diameter of 53 mm and length 1000 mm, which are arranged in alternation. The filling consists of 6 mm Raschig rings with a middle element. This gives rise to a bed volume of 6.3 l with a capacity of 1.1 l.

The tubular reactor is safeguarded with a safety valve on the entrance side.

Postcondensation

The separator connected downstream serves for phase separation of the mixture of prepolymer and steam, which flows into the apparatus via an inlet tube. The separator has a design length of 1200 mm and an internal diameter of 102 mm, the last 5 cm tapering conically. The inlet tube is arranged laterally and eccentrically. With the aid of this 8 mm tube opened at the bottom, the phase mixture is introduced in the half of the separator close to the wall.

In order to keep the prepolymer in molten form, the separator is temperature-controlled with heating oil through a jacket. The vapors leave the apparatus via the vapor line in the lid in the direction toward to the column for HMD rectification.

Since this system is under pressure (16 bar), a low water content remains dissolved in the polyamide melt.

This water content limits the molecular weight buildup and leads to a melting-point depression.

The polyamide melt is fed to the devolatilizing extruder via a discharge pump.

HMD Recycling

The vapors are introduced into an unheated rectification column. They are washed there with water in countercurrent. This washes water-soluble oligomers out of the column with the wash water. The pressure in the column is controlled by means of a steam-heated regulating valve at the top of the column. This consists of a tube of 1200 mm in length which has an internal diameter of 81 mm and a top and bottom part. In the lower part of the tube, 1.87 l of 10 mm Pall rings are present. At this bed ends a tube bent by 180° (walking stick) as the feed of the circulated bottoms. The rest of the tube is filled with 4.85 l of 10 mm Raschig rings without a central element. The random packings are fixed by 2 meshes between the flanges. The column is irrigated through the top hood. Below the column is disposed a level meter by means of pressure difference. In the column, the organic fractions are washed out of the vapors by means of irrigation. From the circulation system of the column bottoms (approx. 150 l/h), the precipitated fraction is recycled into the product stream upstream of the evaporator reactor. The recycled rate is about 1 l/h. The top stream of the column is removed. This top stream (approx. 15 kg/h) contains all of the water and a small proportion of HMD (0.3-0.5%). The HMD must, since it is removed from the reaction, be considered as a loss.

Devolatilization and Granulation

A discharge pump (gear pump) regulates the constant product stream to the extruder. The extruder is a ZDSK 30. The screw is sealed in the backward direction by means of a cold feed metered addition of 0.2 kg of granules. At the extruder, the water present in the polymer melt is removed by means of a forward devolatilization and a backward devolatilization. The polymer melt is discharged as a strand with a die plate of 3 mm and cooled in a water bath and then granulated with an intake granulation. The granule obtained is collected undried.

Parameters:

170.8 kg of water were mixed with 91.5 kg of hexamethylenediamine solution (69.47% in water, BASF)×4 kg of Dicycan (BASF) or metaxylenediamine (MXD)×5 kg of terephthalic acid, ×6 kg of isophthalic acid (Lonza) in a starting vessel at 90° C.

22.2 kg/h of salt solution were pumped within the system 39 at ×8° C. external temperature (evaporator) and ×9° C. external temperature (separator) and 17 bar. The column was operated with a 1 kg/h irrigation and ×12 kg/h circulation, ×13 mol % of HMD/initial HMD were recycled. X 14% by weight/monomers of coupling agent were added (position 1-2-3-4). X 15 HMD loss in mol %/initial HMD.

The polymer melt was extruded and granulated at 310° C. and then heat treated at 200° C. for ×17 hours.

X 18: VN before heat treatment, ×19: AEG before heat treatment

X 20: VN after 20 hours of heat treatment

X21: AEG after 20 hours of heat treatment

The results are compiled in the table which follows.

| | X4 Dicycan/ MXD kg | X5 TPS kg | X6 IPS kg | X8 IT evap. °C. | X9 AT sep. °C. | X12 circulation kg/h | X13 recycling % mol | X14 coupling agent kg/h | X15 HMD loss % mol | X17 coupling agent metering point | X18 VN | X19 AEG mmol/kg | X20 VN 20 h | X21 AEG mmol/kg |
|---|---|---|---|---|---|---|---|---|---|---|---|---|---|---|
| Example 1 | D 4.54 | 61 | 33.49 | 316 | 316 | 146 | 0.38 | none | 0.68 | — | 63 | 81 | 90 | 33 |
| Example 2 | D 4.54 | 61 | 33.49 | 316 | 316 | 152 | 0.38 | HMD 0.1 | 1.72 | 1 | 63 | — | 107 | — |
| Example 3 | D 4.54 | 61 | 33.49 | 316 | 316 | 149 | 0.38 | HMD 0.2 | 0.47 | 1 | 57 | 191 | 125 | 103 |
| Example 4 | D 4.54 | 61 | 33.49 | 315 | 315 | 142 | 0.38 | HMD 0.1 | 0.68 | 2 | 53 | 170 | 114 | 104 |
| Example 5 | D 4.54 | 61 | 33.49 | 316 | 316 | 149 | 0.38 | D 0.18 | 0.63 | 1 | 56 | 172 | 111 | 83 |
| Example 6 | D 4.54 | 61 | 33.49 | 316 | 316 | 149 | 0.38 | D 0.18 | 0.6 | 1 | 58 | 74 | 102 | 100 |
| Example 7 | D 4.54 | 61 | 33.49 | 315 | 315 | 150 | 0.38 | D 0.18 | 0.76 | 4 | 51 | 214 | 105 | 108 |
| Example 8 | MXD 3.66 | 64.73 | 30.61 | 318 | 318 | 157 | 0.38 | MXD 0.12 | 0.67 | 1 | 65 | 141 | 160 | 65 |
| Example 9 | MXD 3.66 | 64.73 | 30.61 | 318 | 318 | 138 | 0.38 | HMD 0.1 | 0.58 | 1 | 64 | 115 | 127 | 60 |
| Example 10 | MXD 3.66 | 66.66 | 28.7 | 319 | 319 | 0 | 0.38 | MXD 0.12 | 0.72 | 1 | 64 | 143 | 149 | 66 |

The invention claimed is:

1. A process for preparing a polyamide based on dicarboxylic acids and diamines, comprising the following stages:
   1) providing an aqueous monomer mixture consisting of a dicarboxylic acid mixture of from 60 to 88% by weight of terephthalic acid and from 12 to 40% by weight of isophthalic acid, in which up to 20% by weight of the dicarboxylic acid mixture may be replaced by other dicarboxylic acids, and hexamethylenediamine which may be up to 20% by weight replaced by other $C_{2-30}$-diamines, the molar ratio of dicarboxylic acids to diamines being adjusted such that a molar deficiency of diamines of from 1 to 10 mol % is present at the outlet of stage 3), based on the other component in each case,
   2) transferring the aqueous mixture from stage 1) to a continuous evaporator reactor which is a vertical tubular reactor flowed through from the top downward in which diamines and dicarboxylic acids are reacted at a temperature in the range from 100 to 370° C. and a pressure in the range from 1 to 50 bar,
   3) transferring the mixture from stage 2) to a separator which is operated at a temperature in the range from 100 to 370° C. with removal of gaseous components, wherein said separator is under a pressure of 16-17 bar,
   4) transferring the mixture from stage 3) together with diamine in an amount suitable to balance out the molar deficiency and to increase the amino end group content by at least 20 mmol/kg into an extruder which is operated at a temperature in the range from 150 to 400° C. for a residence time in the range from 10 seconds to 30 minutes to remove gaseous components through devolatilizing orifices;

wherein, in the monomer mixture, equimolar amounts of dicarboxylic acids and diamines are present, from 0.5 to 15% by weight of the hexamethylenediamine used in stage 1) is removed in gaseous form in the separator in stage 3), and sufficient hexamethylenediamine is added in stage 4) that the content of amino end groups in the resulting polyamide at the end of the extruder is from 70 to 220 mmol/kg; and wherein steam and volatile dicarboxylic acids or diamines are removed in stage 3) and are subsequently separated by distillation, and an aqueous condensate enriched in dicarboxylic acid or diamine is recycled into one or both of stages 1) and 2).

2. The process according to claim 1, wherein the extrusion is followed by a solid-phase postcondensation and a granulation step.

3. The process according to claim 1, wherein fibers, fillers, dyes, assistants or mixtures thereof are supplied directly in the extruder for compounding.

4. The process according to claim 1, wherein said separator is under a pressure of 16 bar.

5. The process according to claim 1, wherein said separator is under a pressure of 17 bar.

* * * * *